United States Patent [19]

Moore

[11] 4,081,229

[45] Mar. 28, 1978

[54] COMPACTOR FOR HOT BRIQUETTING

[76] Inventor: James E. Moore, 1401 Meadow La., Glenview, Ill. 60025

[21] Appl. No.: 789,633

[22] Filed: Apr. 21, 1977

[51] Int. Cl.$^2$ .......................... B29C 3/02; B29C 3/04; B29C 3/06; B29C 15/00

[52] U.S. Cl. .................................... 425/144; 425/237; 427/367

[58] Field of Search ................ 425/137, 237, 367, 144

[56] References Cited

U.S. PATENT DOCUMENTS

| | | | |
|---|---|---|---|
| 2,843,879 | 7/1958 | Komarek et al. | 425/237 |
| 3,193,377 | 7/1965 | Guseman et al. | 425/237 X |
| 3,303,537 | 2/1967 | Mislan | 425/137 X |
| 3,366,717 | 1/1968 | Rohaus | 425/237 X |
| 3,627,288 | 12/1971 | MacDonald | 425/237 X |
| 3,734,659 | 5/1973 | Harris | 425/237 X |
| 3,820,933 | 6/1974 | Aspin | 425/367 |
| 3,824,054 | 7/1974 | Harris | 425/237 X |
| 3,932,169 | 1/1976 | Anthony | 425/237 X |
| 3,973,484 | 8/1976 | Jarrett et al. | 425/237 X |

*Primary Examiner*—J. Howard Flint, Jr.

*Attorney, Agent, or Firm*—Leydig, Voit, Osann, Mayer & Holt, Ltd.

[57] ABSTRACT

A briquetting machine including a pair of compacting rolls, a pair of cheek plates enclosing the nip of the rolls, a generally rectangular feeding chute having a damper, means for automatically regulating the damper to control the roll force and a rectangular off-gas conduit extending upwardly from the nip, all designed to uniformly feed the rolls, minimizing feed entrainment in the off gas, and when hot materials are fed, to minimize exposure of the rolls to heat. Also included are cooling enclosures for the rolls and other parts exposed to high temperature and means for measuring the temperature of each roll and automatically regulating the flow of the cooling fluids and the positions of the cooling enclosures so as to maintain the temperature of the roll surfaces within predetermined ranges.

16 Claims, 3 Drawing Figures

COMPACTOR FOR HOT BRIQUETTING

Figures 1, 1A:
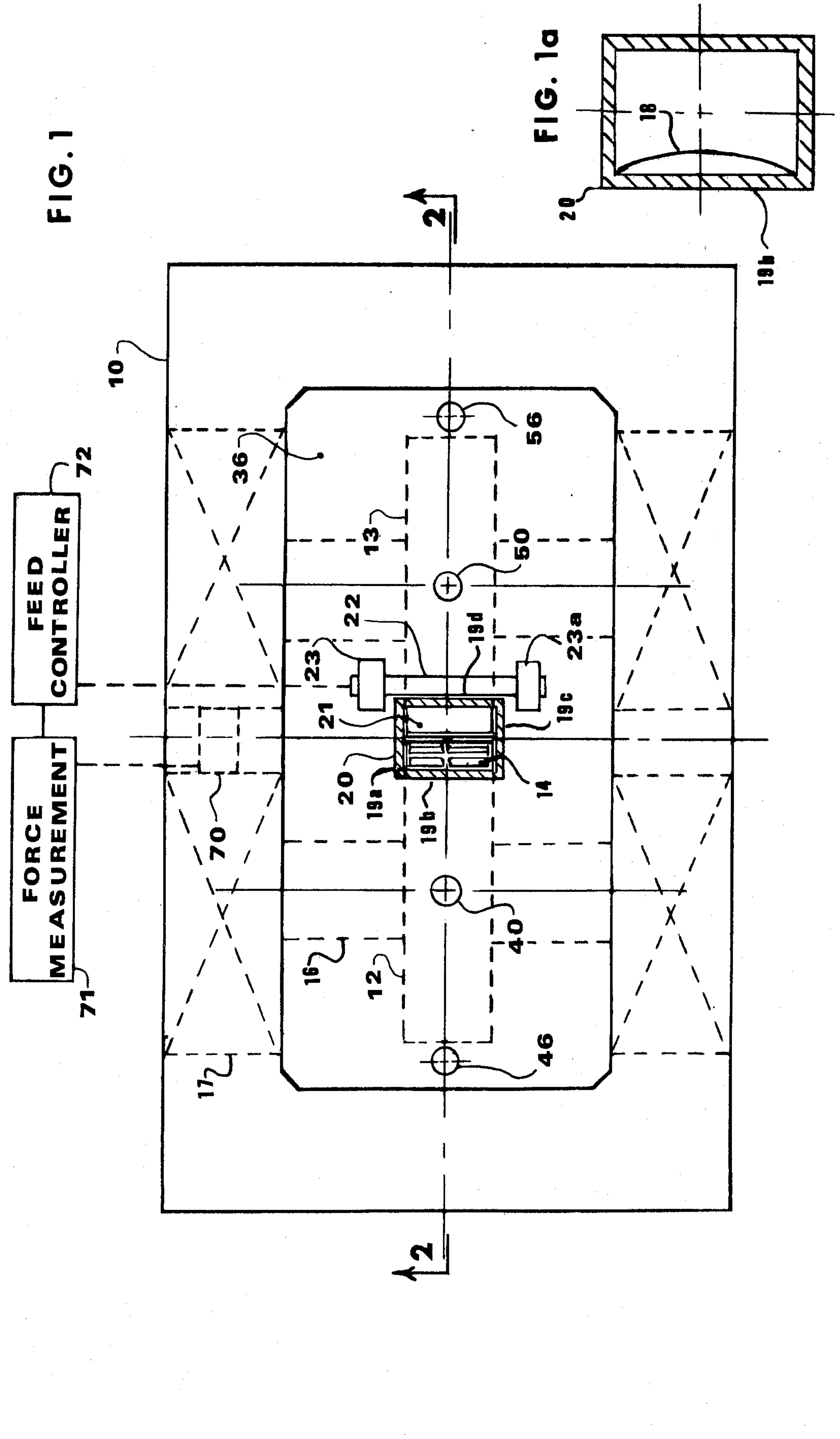

The usual briquetting machine consists of a pair of cooperating rolls, mounted in opposition, and a means of feeding material into the nip of the rolls. It is important that the feed material be distributed properly across the face of the rolls immediately above the nip in order to obtain a consistently uniform compacted product. Proper distribution of feed becomes particularly difficult when the rolls are wide, when there are several rows of pockets across the face of the rolls or when compaction is carried out at high pressure. Proper feeding and distribution of the feed into the nip is particularly critical when a dense particulate material is briquetted at high temperature and high pressure without a binder, especially if the material remains somewhat hard and refractory, even at high temperature, as is the case with materials such as iron oxide.

When materials are briquetted at high temperature, it is necessary to minimize contact between the hot material and the rolls and to cool the rolls and certain other parts exposed to the hot material; however, it usually is advantageous to maintain the rolls as hot as practicable, without damaging them, in order to avoid overcooling of the material being compacted. The feeding devices used heretofore, such as feed hoppers equipped with feed screws, have not been satisfactory for many applications, particularly when wide compactor rolls have been used, even with multiple screws. The briquetting pockets have not been uniformly filled and, when the compacted product has been in the form of a sheet, the outer edges of the sheet have been inadequately compacted. Also, when hot briquetting, the rolls have been exposed to excessive heating, due to the necessity for having a large feeder opening above the nip of the rolls to accommodate the feed screw. In addition, screw feeders are expensive and are susceptible to damage and wear, especially when used to feed hot material.

Equipment and methods used heretofore for cooling the compactor rolls when processing extremely hot materials have not resulted in adequate control over roll temperatures. Consequently it has been necessary to use very expensive materials of construction for the rolls and to replace them more often than would be necessary if adequate control of roll temperature were attainable.

It is, accordingly, an object of the present invention to provide a simple, low-cost feeding device suitable for gravity feeding of free-flowing material to briquetting machine rolls. It is another object to provide a feeding mechanism that can be regulated to accurately adjust the feed rate automatically. It is a related object to provide a feeder that reduces to a minimum the exposure of the rolls to high temperature feed material by channelling the feed directly into the nip of the rolls. It is still another related object to provide a special channel originating at the nip for gases evolved during compaction to be evacuated without excessive entrainment of particulate matter from the nip and, when hot materials are being processed, to prevent excessive contact of hot gases and hot entrained solids with the rolls. It is yet another object to provide a device that feeds the proper amount of material to each point across the face of the rolls, so as to obtain a uniformly compacted product.

Another object of this invention is to provide an adequate means for cooling the rolls when used to process high temperature feed material, so as to maintain the roll surface at a high enough temperature to avoid over-cooling the feed but not high enough to damage the rolls by softening them and thereby making them vulnerable to abrasion. It is a related object to provide means for continuously measuring the temperature of each roll and automatically controlling its temperature within pre-set limits.

It is another object of this invention to provide special features for a compacting machine, for hot briquetting particulate feed material containing heat softenable matter, that contains the feed and effluent gases while in the vicinity of the nip of the rolls, so as to minimize exposure of the rolls to heat, with means for automatically and efficiently cooling the rolls, so that low-cost materials of construction can safely be used for the roll surfaces and so that roll life can be increased.

Other objects and advantages of the invention will become apparent upon reading of the attached detailed description and upon reference to the drawings in which:

FIG. 1 is a plan view of a briquetting machine constructed in accordance with this invention.

FIG. 1*a* is a fragmentary plan view showing a preferred chute cross section.

Figure 2:
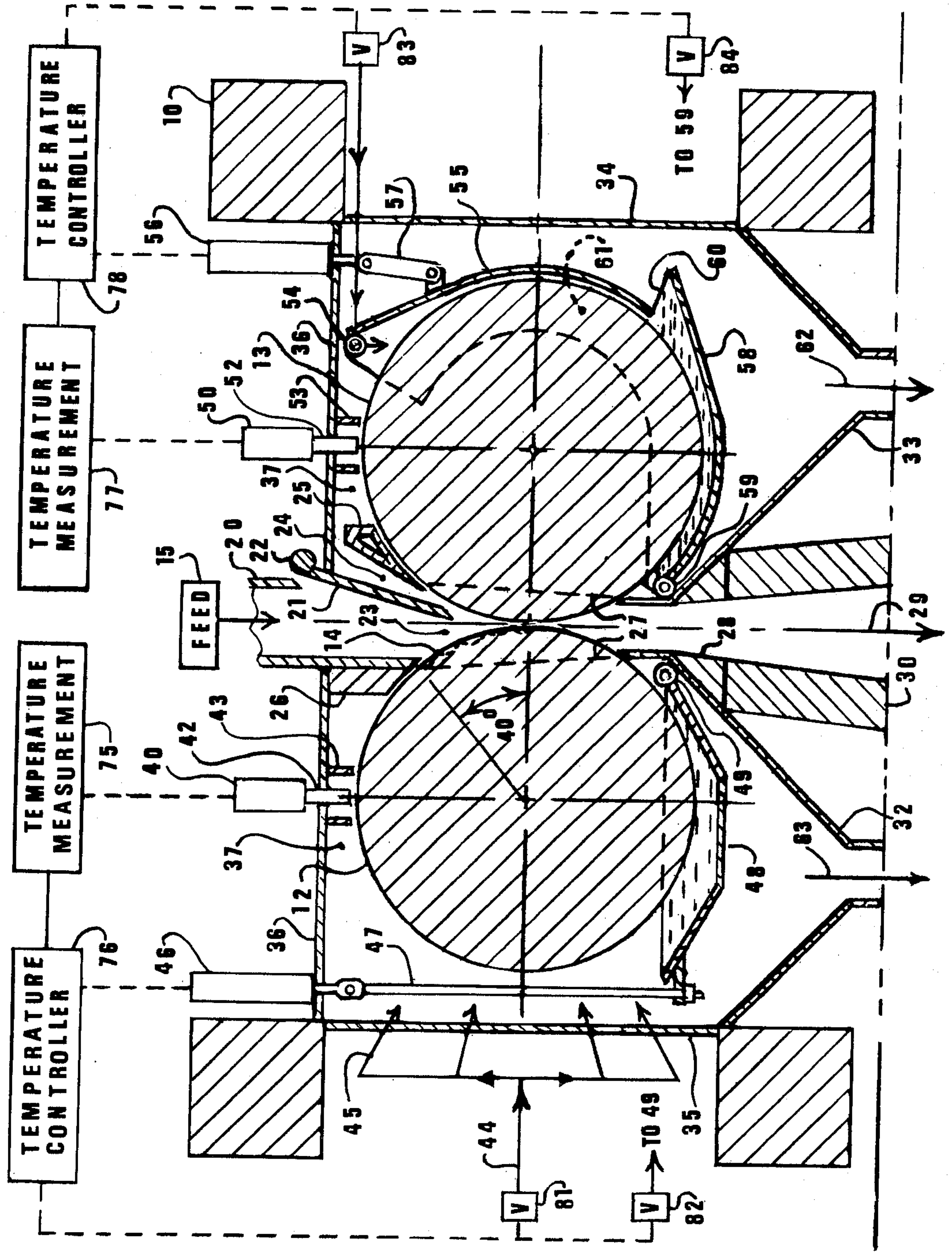

FIG. 2 is a schematic vertical cross sectional view, looking along line 2—2 in FIG. 1.

Turning now to FIG. 1, a plan view of a briquetting machine 10 is shown, having two opposing rolls 12 and 13 mounted on shafts 16 journaled in bearing blocks 17 and into which feed material 15 is fed via inlet chute 20 having end walls 19*a*, 19*c* and side walls 19*b*, 19*d*. The rolls have pockets 14. Within the inlet chute is a feed regulating damper 21. The damper 21 is mounted on a rockable shaft 22, which is supported by bearings 23. A force measuring element 70, which is shown schematically, mounted between opposed bearing blocks 17, senses the force applied by the rolls to the feed material and transmits its signal to a force measuring device 71, which activates feed controller 72 to regulate the position of the damper 21. The top of the machine is enclosed by a cover 36 on which are mounted temperature sensing elements 40 and 50, temperature measuring devices 75, 77, controllers 76, 78 which bring about a corrective change in power actuators 46, 56. The latter may be seen more clearly in the cross sectional view of FIG. 2, looking along line 1—1 of FIG. 1.

Referring to FIG. 2, the two rolls 12 and 13 and inlet chute 20 are shown in profile, with damper 21 in cross section. As can be visualized, clockwise rotation of the shaft results in restricting or closing feed chute 20 by damper 21, whereas, counterclockwise movement enlarges the opening between the side wall of the chute and the damper, thereby permitting more feed to enter the nip of the roll through passageway 23. The side of the feed chute may be bellied inwardly by adding a curved section 18 of hard facing material to the lower end of the side wall 19*b*, as shown in FIG. 1*a*, so that the passageway is relatively narrowed at the center and enlarged where additional feed is required, as at the edges of the rolls to compensate for leakage at the cheek plates 27 and entrainment of feed by effluent gas. Alternatively, the damper 21 may be bellied inwardly for the same purpose.

When pocketed or corrugated rolls are used, the uneven surfaces 14 of the rolls tends to facilitate feeding of material into the nip. A passageway 24 is provided between the damper 21 and a barrier 25 to allow gases evolved at the nip during compaction to pass upward into an enlarged area, where entrained feed material can drop out and fall back into the nip, with the gases passing over the barrier 25 and into the interspace 37 above the roll 13 and below the cover 36. In order to minimize heat transfer to the rolls, the feed chute 20 is insulated by refractory insulation 26 and the barrier 25 is water cooled. Also, it is desirable to restrict the sector of roll surface exposed to hot feed and gases as much as practicable, preferably at the lower end of the range of 20° to 45°. The sector of rolls exposed to hot material in FIG. 2 is 40°.

The cheek plates 27, the outer edges of which are outlined by the dotted lines, enclose both sides of the rolls above and below the nip of the rolls so as to form a continuous high temperature passageway from the feed pipe 20 through the passage 28 to the discharge opening 30, through which the briquettes 29 are discharged. The passage 28 may include a breaker to break the briquettes from the flash which interconnects them. The briquette opening 30 is insulated by a refractory lining. The briquetting machine frame, together with two lower bottom sections 32 and 33, the two side wall sections 34 and 35, the top cover 36 and two side wall covers (not shown) enclose all of the inner portions of the machine to form the interspace 37 previously mentioned.

Two means for water cooling of the rolls are illustrated. In one the temperature of roll 12 is measured by an infrared ray sensing element 40, which is aimed at the surface of the roll through tube 42 within an area isolated by baffles 43. The signal from temperature element 40 is transmitted to temperature recorder 75 which activates temperature controller 76 which, in turn, regulates, by means of valves 81 and 82, the amount of water 44 sprayed onto the rolls through sprays 45 and through holes in pipe 49, which is connected to a water pan 48. The roll 12 rotates in the water contained in water pan 48, and the level of water in the pan is regulated automatically by temperature controller 76 and actuator 46 which raises and lowers one end of the pan by means of rod 47. The other end of the pan is pivoted around pipe 49, which also serves as a shaft and support for the pan. Water overflowing the pan, steam, and any entrained solids 63 exit this section of the briquetting machine through the funnel-shaped outlet 32.

The temperature of the other roll 13 is measured by temperature element 50, which is identical in arrangement to that of temperature 40. The signal from temperature element 50 is transmitted to temperature recorder 77 which, in turn, functions through temperature controller 78 to regulate, by means of valves 83 and 84, the water input to spray pipes 54 and 59, which provide the water cooling for the roll. The water is contained between the roll 13 and an arcuate enclosure formed by an essentially vertical section 55, an approximately horizontal section 58, and two side walls 61 (the dotted lines indicate portions of the enclosure obscured by the roll). The enclosure has a passageway 60 for excess water, steam, and entrained solids to flow from the enclosure into the interspace. The level of water within the enclosure and the effectiveness of the cooling are adjusted by the temperature controller 78 through actuator 56 and arm 57, which raise and lower one end of the enclosure, which is pivoted around pipe shaft 59, previously mentioned. The steam, other gases, water, and entrained solids 62 exit this section of the machine through outlet 33.

While the means defining the cooling enclosure (FIG. 2) is somewhat different for the left and right-hand compactor rolls, it will be understood that this difference is simply to illustrate two possible constructions falling within the scope of the invention, and in practice the same shape of cooling enclosure, in mirror image, will be employed for each of the rolls comprising a pair.

I claim:

1. A briquetting machine for hot briquetting feed material containing heat-softenable matter comprising, in combination, a frame, a pair of opposed briquetting rolls having shafts and bearing blocks supported by the frame, high temperature feeding, compacting and discharge zones defined by inlet and outlet nips between the rolls, a high temperature enclosure surrounding only the high temperature feeding, compacting and discharge zones, cooling enclosures surrounding portions of the respective rolls external to the high temperature enclosure, and means for directing cooling fluid into the enclosures for contacting the rolls for cooling the same.

2. A briquetting machine for hot briquetting feed material containing heat-softenable matter comprising, in combination, a frame, a pair of opposed briquetting rolls having shafts and bearing blocks supported by the frame, high temperature feeding, compacting and discharge zones defined by inlet and outlet nips between the rolls, a high temperature enclosure in the form of a chute including cheek plates vertically extending from the feed inlet at the top to the product outlet at the bottom arranged adjacent the sides of the rolls in the region of the nips, means defining a cooling water enclosure for each roll, means for conducting cooling water into the cooling water enclosures for cooling the respective rolls, and an outer enclosure surrounding and spaced from the cooling water enclosure, the outer enclosure having a discharge at the bottom for discharge of spent cooling water exiting from the associated cooling water enclosure.

3. The combination as claimed in claim 1 in which the cooling water enclosures include, as a lower element, a pan at least partially filled with cooling water and in which the lower portion of the associated roll is submerged as it rotates.

4. The combination as claimed in claim 1 in which the cooling water enclosures each include a horizontal portion in the form of a pan and a vertical portion enclosing the roller, with an opening between the two portions through which water, solids and gases can be discharged and means for injecting water between the roll and at least one of the two portions.

5. The combination as claimed in claim 1 in which means are provided for constantly sensing the temperature of each roll and for making corrective changes in the cooling means so that the roll temperature tends to be maintained constant.

6. The combination as claimed in claim 1 in which means are provided for sensing the temperature of each roll and for correctively supplying fluid to the cooling enclosures for maintaining the roll temperature substantially constant.

7. The combination as claimed in claim 3 in which means are provided for sensing the temperature of the rolls and for making a corrective adjustment in the degree of submergence thereby to maintain the roll temperature substantially constant.

8. The combination as claimed in claim 5 in which the roll temperature measuring means is in the form of an infrared ray sensing device aimed at a point on the surface of the roll so as to sense the temperature of the roll immediately before it re-enters the high temperature feeding zone.

9. A briquetting machine for briquetting a free-flowing particulate feed material comprising, in combination, a pair of compacting rolls, a pair of cheek plates closely spaced to the rolls on opposite sides thereof for enclosing the nip of the rolls and forming a feeding zone between the rolls above the nip, a source of feed above the nip, a substantially rectangular conduit extending from the source of feed downwardly to a position adjacent the nip, a feed regulating means in the conduit, the conduit terminating sufficiently above the surface of the rolls so as to leave a gap thereunder to permit the gases evolved at the nip as a result of compaction of the feed to escape upwardly between the feed conduit and at least one of the rolls.

10. The combination as claimed in claim 9 in which the feed material is at a high temperature and in which the conduit at the point of discharge into the nip of the rolls is constricted in the transaxial direction so as to avoid excessive contact between the hot feed material and the surfaces of the rolls, and means defining an off gas conduit for channeling off gas from the nip of the rolls so as to minimize contact of the surface of the rolls by hot off gas and feed material entrained therein.

11. The combination as claimed in claim 10 in which the off gas conduit diverges upwardly to produce an increase in cross sectional area thereof thereby to reduce the velocity of the off gas so that feed material entrained therein may drop out of the gas stream and fall back into the nip of the rolls.

12. The combination as claimed in claim 9 in which the substantially rectangular feed conduit extends across the full width of the working face of the rolls and in which at least one of the sides of the conduit is bellied inwardly to reduce the width and hence the feed rate at the center of the conduit.

13. The combination as claimed in claim 10 in which the feed conduit is of such width that the sector of each roll surface which is exposed to the hot feed material and effluent gas above the nip is within the range of 20° to 45°.

14. A briquetting machine for hot briquetting particulate feed material containing heat-softenable matter comprising, in combination, a frame, a pair of opposed briquetting rolls of equal width and having alined axial faces, the briquetting rolls having shafts journaled in bearing blocks supported by the frame, the rolls having inlet and outlet nips, a source of feed above the inlet nip, a vertical inlet chute extending into the vicinity of the inlet nip, a vertical outlet chute extending from the vicinity of the outlet nip, the chutes having an axial dimension substantially equal to the width of the rolls, the inlet and outlet chutes being joined by parallel cheek plates enclosing the inlet and outlet nips, one of the axially extending walls of the inlet chute being swingable about a horizontal axis to form a damper to vary the effective width of the inlet chute as viewed in the axial direction thereby to vary the rate of flow of feed material into the inlet nip.

15. A briquetting machine for hot briquetting particulate feed material containing heat-softenable matter comprising, in combination, a frame, a pair of opposed briquetting rolls of equal width and having alined axial faces, the briquetting rolls having shafts journaled in bearing blocks supported by the frame, the rolls having inlet and outlet nips, a source of hot feed material above the inlet nip, a vertical inlet chute extending into the vicinity of the inlet nip, a vertical outlet chute extending from the vicinity of the outlet nip, the chutes having an axial dimension substantially equal to the width of the rolls, the inlet and outlet chutes being joined by parallel cheek plates enclosing the inlet and outlet nips so that the chutes and cheek plates together define a high temperature zone, cooling enclosures extending about the rolls outside of the high temperature zone, means for feeding water into the cooling enclosures, one of the axially extending walls of the inlet chute being displaceable to form an adjustable damper to very the effective width of the inlet chute as viewed in the axial direction thereby to vary the rate of flow of feed material into the inlet nip, the backside of the damper communicating with the adjacent cooling enclosure so that gas given off at the nip fows into such cooling enclosure.

16. The combination as claimed in claim 15 in which a fixed baffle is provided between the damper and the surface of the adjacent roll, the damper and baffle together defining a conduit for the gas.

* * * * *